United States Patent
Odajima et al.

(10) Patent No.: US 10,560,010 B2
(45) Date of Patent: Feb. 11, 2020

(54) LINEAR VIBRATION MOTOR

(71) Applicant: Nidec Copal Corporation, Tokyo (JP)

(72) Inventors: Shin Odajima, Tokyo (JP); Yoshinori Katada, Tokyo (JP); Shiori Ishii, Tokyo (JP); Noboru Segawa, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 15/763,286

(22) PCT Filed: Sep. 27, 2016

(86) PCT No.: PCT/JP2016/078363
§ 371 (c)(1),
(2) Date: Mar. 26, 2018

(87) PCT Pub. No.: WO2017/057315
PCT Pub. Date: Apr. 6, 2017

(65) Prior Publication Data
US 2018/0278136 A1    Sep. 27, 2018

(30) Foreign Application Priority Data
Sep. 28, 2015  (JP) .................................. 2015-190295

(51) Int. Cl.
*H02K 33/12*    (2006.01)
*G08B 6/00*    (2006.01)

(52) U.S. Cl.
CPC ............... *H02K 33/12* (2013.01); *G08B 6/00* (2013.01)

(58) Field of Classification Search
CPC ........ H02K 33/12; H02K 33/00; H02K 33/06; H02K 33/02; H02K 33/18; H02K 33/16; H02K 35/02

(Continued)

(56) References Cited

U.S. PATENT DOCUMENTS

2004/0104625 A1* 6/2004 Wakuda ............... B06B 1/0215
                                                              310/15
2007/0040457 A1* 2/2007 Shimizu ............ A61C 17/3445
                                                              310/15
(Continued)

FOREIGN PATENT DOCUMENTS

JP    1982-171118 A    10/1982
JP    1982-193962 A    11/1982
(Continued)

OTHER PUBLICATIONS

JP-57193962-A, machine translation abtract on Mar. 31, 2019.*
International Search Report dated Oct. 25, 2016 during the prosecution of PCT/JP2016/078363, English Translation.

*Primary Examiner* — Jermele M Hollington
*Assistant Examiner* — Leda T Pham

(57) ABSTRACT

A linear vibration motor comprises: a movable element that comprises a magnet portion, a weight portion, and a yoke; a frame for enclosing the movable element; a coil, secured to the frame, for applying a driving force to the magnet portion so as to cause the movable element to undergo reciprocating vibration along the axial direction; and an elastic member for applying, to the movable element, an elastic force that repels the driving force that is applied to the magnet portion, wherein: a magnetic material portion (a magnetic material piece) that extend along the direction of vibration of the movable element is provided on an inner surface of the frame, and the yoke has a raised portion near the magnetic material portion (the magnetic material piece).

6 Claims, 5 Drawing Sheets

(58) Field of Classification Search
USPC .................................................... 310/15–39
See application file for complete search history.

(56) References Cited

U.S. PATENT DOCUMENTS

| | | | |
|---|---|---|---|
| 2012/0313459 A1* | 12/2012 | Zhang | H02K 33/18 310/25 |
| 2014/0035397 A1 | 2/2014 | Endo et al. | |
| 2015/0137627 A1 | 5/2015 | Katada et al. | |

FOREIGN PATENT DOCUMENTS

| | | | | |
|---|---|---|---|---|
| JP | 57193962 A | * | 11/1982 | ........... H02K 41/031 |
| JP | 2011-97747 A | | 5/2011 | |
| JP | 2014-28349 A | | 2/2014 | |
| JP | 2015-95943 A | | 5/2015 | |

* cited by examiner

LINEAR VIBRATION MOTOR

CROSS-REFERENCE TO RELATED APPLICATIONS

This is a U.S. national phase application under 35 U.S.C. § 371 of International Patent Application No. PCT/JP2016/078363, filed Sep. 27, 2016, and claims benefit of priority to Japanese Patent Application No. 2015-190295, filed Sep. 28, 2015. The entire contents of these applications are hereby incorporated by reference.

FIELD OF TECHNOLOGY

The present invention relates to a linear vibration motor.

BACKGROUND

Vibration motors (or "vibration actuators") are built into mobile electronic devices, and are broadly used as devices to communicate to the user, through a vibration, that there is an incoming call, or that a signal, such as an alarm, has been generated, and have become indispensable devices in wearable devices, which are carried on the body of the user. Moreover, in recent years vibration motors have been of interest as devices by which to achieve haptics (skin-sensed feedback) in the human interfaces such as touch panels.

Among the various forms of vibration motors that are under development, there is interest in linear vibration motors that are able to generate relatively large vibrations through linear reciprocating vibrations of a movable element. A conventional linear motor is provided with a weight and a magnet on a movable element side, where an electric current is applied to a coil that is provided on the stator side to cause the Lorentz forces that act on the magnet to form a driving force, to cause the movable element, which is elastically supported along the direction of vibration, to undergo reciprocating vibrations (referencing Japanese Unexamined Patent Application Publication 2011-97747).

SUMMARY

With smaller and thinner mobile electronic devices there is the need for smaller and thinner vibration motors to be equipped therein. In particular, in electronic devices that are provided with flat-panel display portions, such as smartphones, the space within the device in the direction of thickness, which is perpendicular to the display panel, is limited, and thus there is a strong need for the vibration motor, which is equipped therein, to be thinner.

When attempting to achieve a reduction in the thickness of a linear vibration motor, one may achieve a reduction in thickness while maintaining the volume of the magnet and the mass of the weight through attempting to obtain the desired driving force by securing an adequate magnet volume, and to obtain the desired inertial force through ensuring an adequate mass in the weight, when reducing the thickness through forming into a flat shape the movable element that is provided with the magnet and the weight. In this case, if the movable element were to rotate around the linear vibrational axis, the flat movable element is of a shape wherein the side portions, due to the rotation, would tend to collide with the peripheral frame, so noise would be produced by the collisions, which would produce an actuation noise, and would lead to a problem in the rattling due to the rotation would prevent stabilized operation.

Because of this, in the prior art a stabilized linear vibration has been achieved through suppressing rolling of the movable element around the vibration axis through the provision of two guide shafts. However, when two stationary shafts are provided, the two stationary shafts are provided on both sides of the magnet, and thus a problem is produced in that the width of the linear vibration motor is wide. In recent years there have been requests for linear vibration motors that are to be installed in miniaturized electronic devices to be more compact, not only in the thickness direction, but in the width direction as well. Moreover, it is necessary to maintain the parallel orientation of the two guide shafts, which requires high precision in assembly, and thus there is a problem in that this interferes with increasing productivity.

In the present invention, the handling of such problems is an example of the problem to be solved. That is, objects of the present invention include the ability to reduce the thickness of a linear vibration motor, to prevent the occurrence of actuation noise caused by rotation of the movable element around the vibrational axis, even when the movable element is of a flat shape, to enable stabilized vibration without rattling, to enable a reduction in thickness and a reduction in width, to enable increased productivity, and the like.

In order to achieve such an object, the linear vibration motor of the present invention is equipped with the following structures:

a movable element equipped with a magnet portion, a weight portion, and a yoke; a frame for containing the movable element; a coil that is secured to the frame, for applying a driving force to the magnet portion so as to cause the movable element to vibrate reciprocatingly along the axial direction; and an elastic member for applying, to the movable element, an elastic force that opposes the driving force that is applied to the magnet portion, wherein: a magnetic material portion that extends along the direction of vibration of the movable element is provided on an inner surface of the frame, and the yoke has a raised portion near the magnetic material portion.

BRIEF DESCRIPTIONS OF THE DRAWINGS

DETAILED DESCRIPTION

Figure 1:
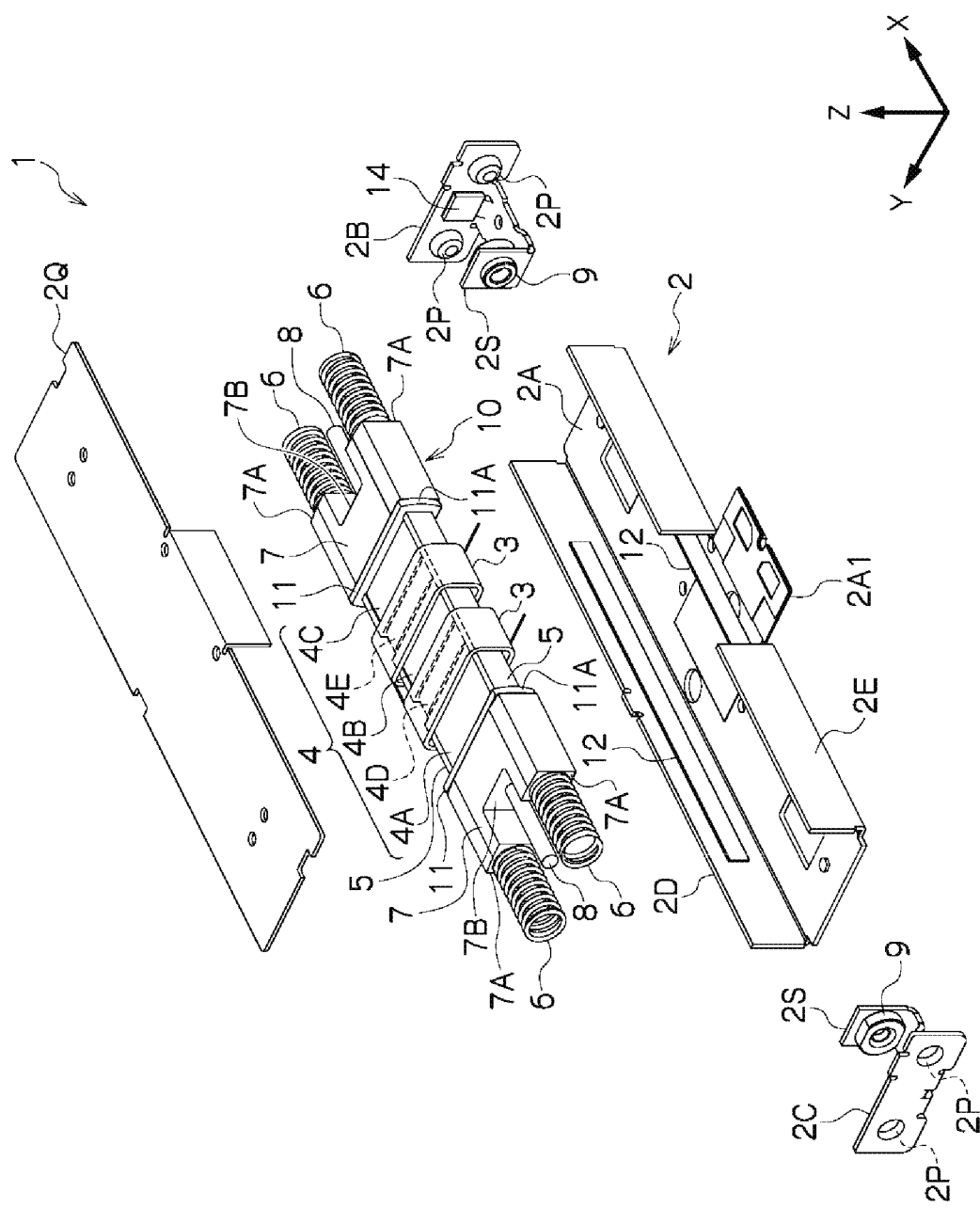
FIG. 1 is an explanatory diagram (an assembly perspective diagram) illustrating a linear vibration motor according to an embodiment according to the present invention.
Figure 2:
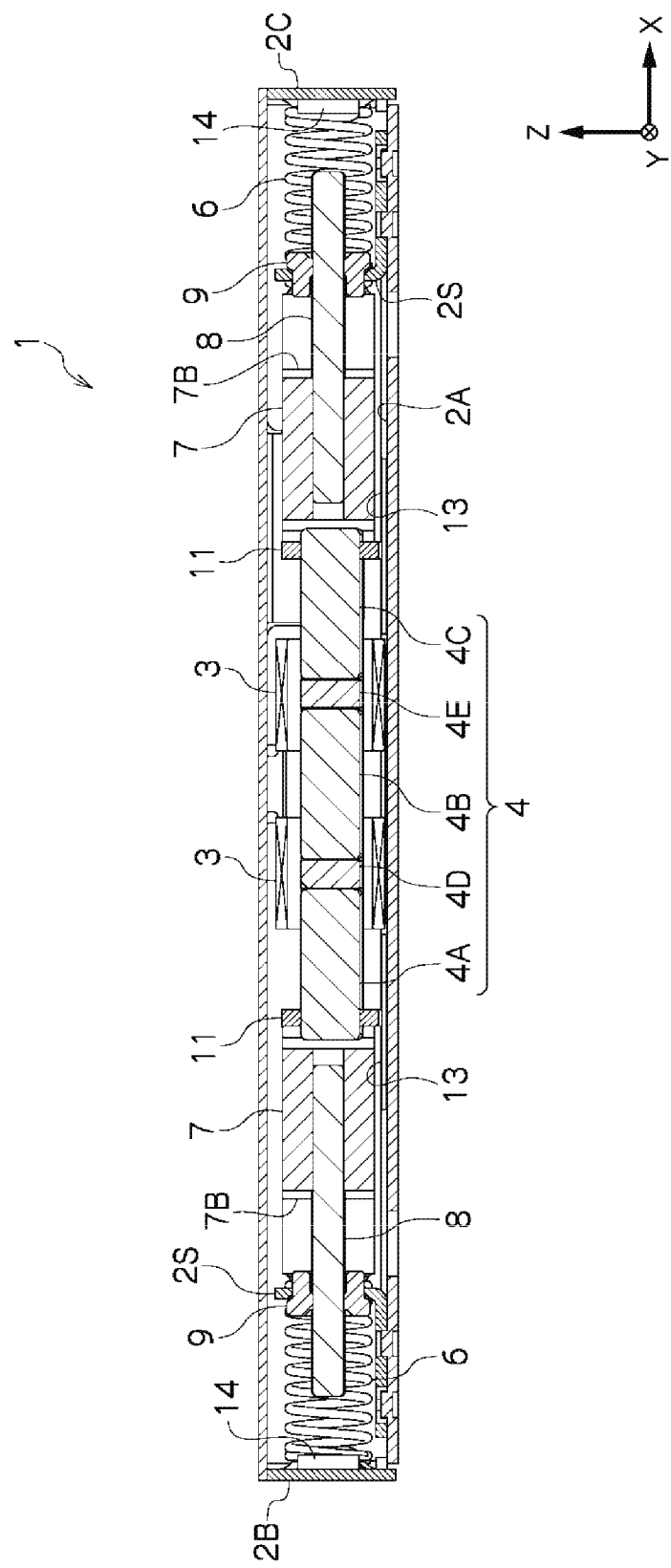
FIG. 2 is an explanatory diagram (a lateral sectional diagram of the assembled state) illustrating a linear vibration motor according to another embodiment according to the present invention.
Figure 3:
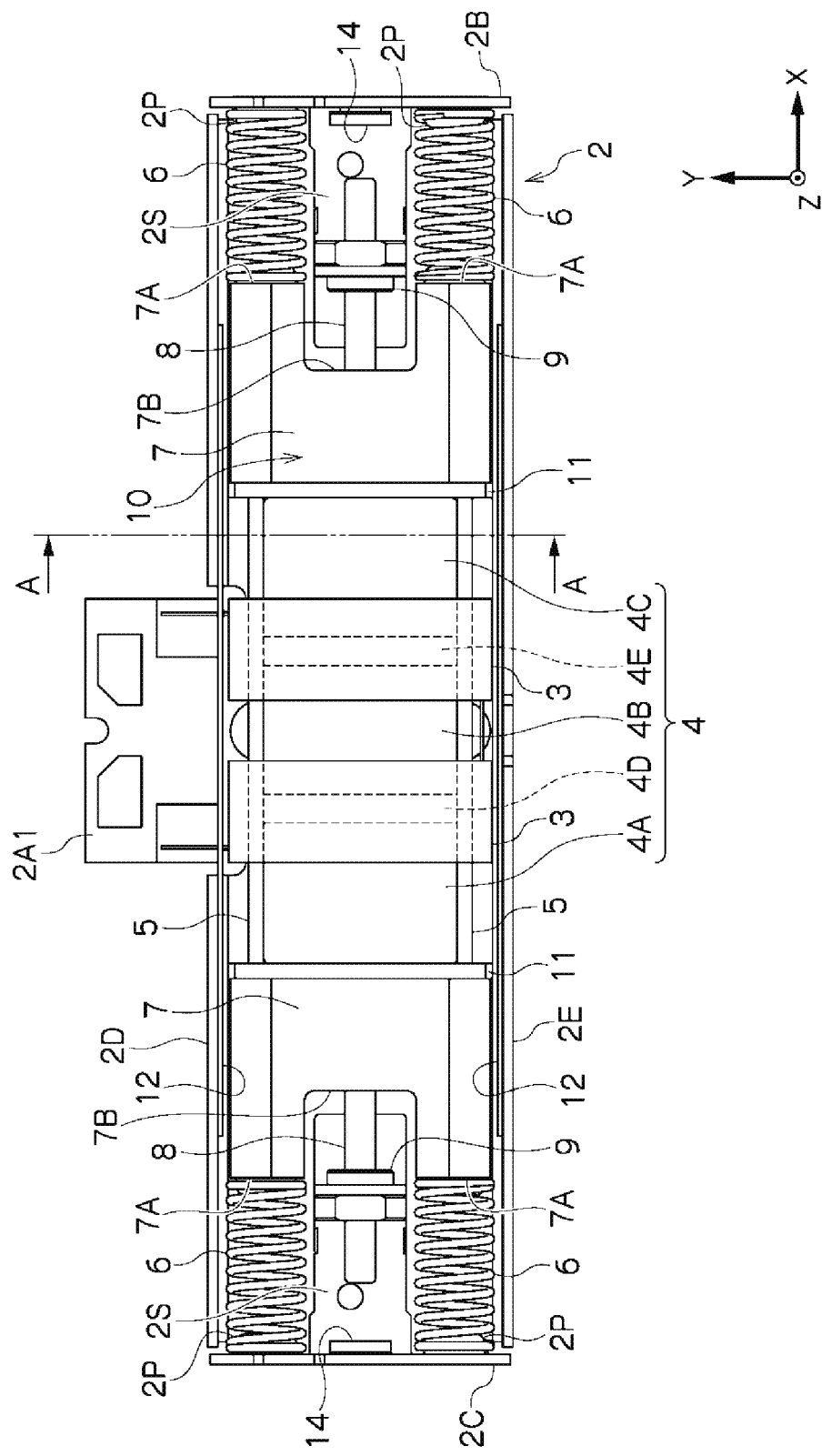
FIG. 3 is an explanatory diagram (a plan view diagram showing the internal structure) illustrating a linear vibration motor according to an embodiment according to the present invention.
Figure 4:
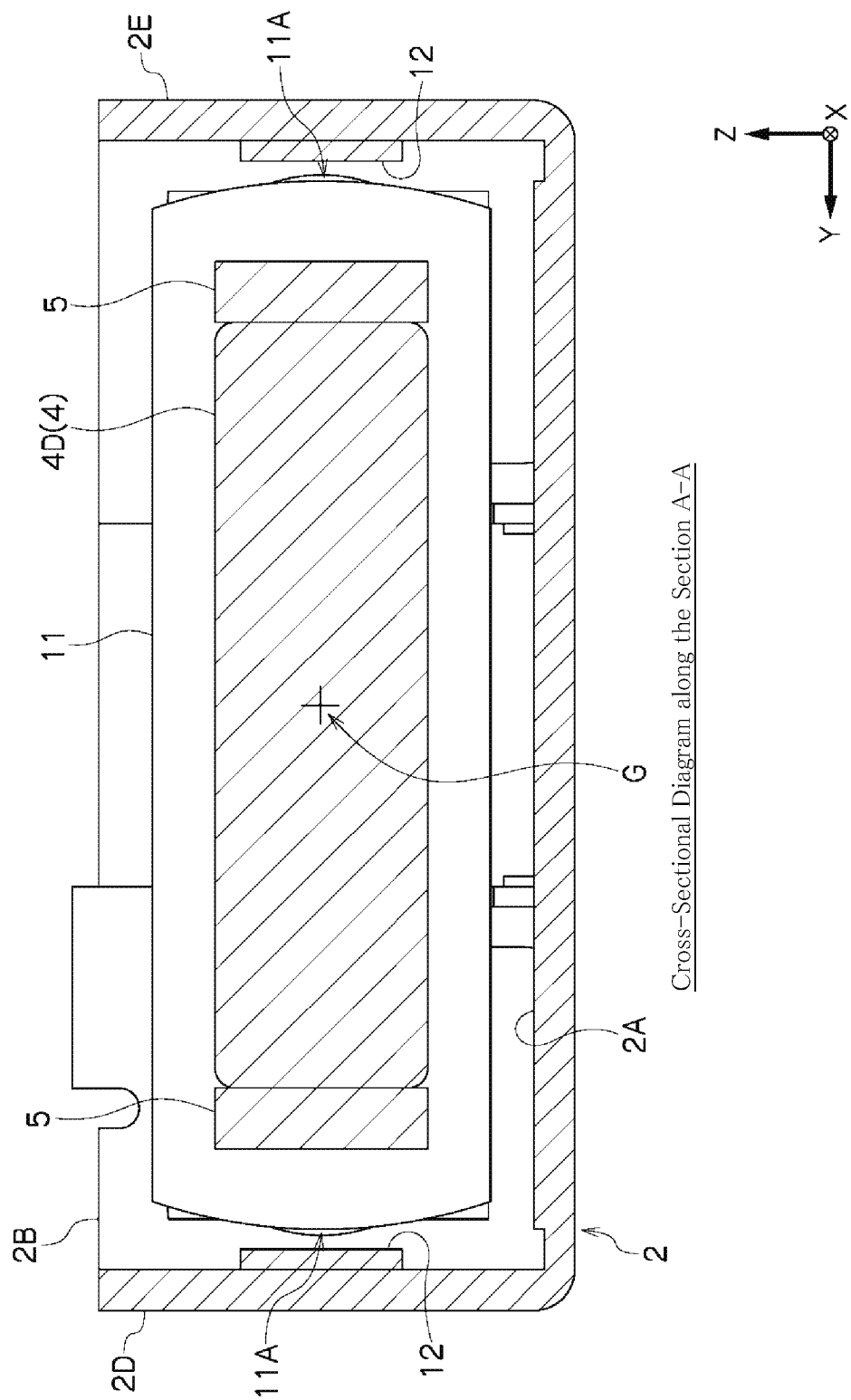
FIG. 4 is an explanatory diagram (a cross-sectional diagram along section A-A in FIG. 3) illustrating a linear vibration motor according to an embodiment according to the present invention.

Embodiment according to the present invention will be explained below in reference to the drawings (where identical reference symbols in different drawings below indicate positions with identical functions, and redundant explanations in the various drawings are omitted). FIG. 1 through FIG. 3 depict the overall structure of a linear vibration motor according to one embodiment according to the present invention, and FIG. 4 shows a cross-sectional view along the section A-A in FIG. 3. The X direction in each of the drawings indicates the direction of vibration (the axial direction), the Y direction indicates the width direction, and the Z direction indicates the thickness (height) direction.

A linear vibration motor 1 according to an embodiment according to the present invention comprises: a movable element 10, a frame 2; a coil 3; and an elastic member 6. The movable element 10 comprises a magnet portion 4, a weight portion 7, and a yoke 11. The frame 2 contains a movable element 10 that vibrates reciprocatingly in the axial direction. The coil 3 is secured to the frame 2, and applies a driving force to the magnet portion 4 so as to cause the movable element 10 to vibrate reciprocatingly along the axial direction. The elastic member 6 applies, to the movable element 10, an elastic force that repels the driving force that is applied to the magnet portion 4.

Additionally, this linear vibration motor 1 is provided with a magnetic material portion (a magnetic material piece 12) that extends along the direction of vibration of the movable element 10, on the inner surface of the frame 2, and the yoke 11 has a raised portion 11A that is adjacent to the magnetic material portion (the magnetic material piece 12) (referencing FIG. 4).

Such a linear vibration motor 1 enables a reduction in thickness through the shape of the movable element 10, and even when a movable element 10 of a flat cross-sectional shape is used, the movable element 10 will undergo reciprocating vibration in a state wherein the orientation is maintained through magnetic flux from the raised portion 11A of the yoke 11 that is provided on the movable element 10 toward the magnetic material portion (magnetic material piece 12) or from the magnetic material portion toward the raised portion 11A of the yoke 11, thus making it possible to prevent extraneous contact between the movable element 10 and the frame 2. This enables the movable element 10 to undergo stabilized reciprocating vibration without rattling.

At this time, it is possible to achieve stabilized vibration of the movable element 10 without supporting the sliding of the movable element through the use of two shafts, as in the prior art, thus enabling an improvement in manufacturability through the ability to eliminate high-accuracy assembly, through eliminating the need to adjust the parallelism of the shafts. Moreover, this makes it possible to achieve a reduction in size in the thickness direction and in the width direction, through the ability to eliminate the two shafts that, in the prior art, had been provided side-by-side in the movable element.

While the present invention will be explained in detail below referencing the drawings, embodiments according to the present invention are not limited thereto.

The frame 2 may have a frame structure that is able to contain the various portions; however, in the example that is illustrated, side walls 2B, 2C, 2D, and 2E are provided extending from the periphery of a rectangular bottom face 2A. In the example in the figure, the side walls 2D and 2E are integrated with the bottom face 2A, and the side walls 2B and 2C are separate units from the bottom face 2A, but there is no limitation thereto, and instead the side walls 2B, 2C, 2D, and 2E may all be integrated with the bottom face 2A.

Moreover, the frame 2 is provided with a cover plate 2Q that covers the content within the frame 2. The cover plate 2Q is formed in a rectangular plate shape that is attached to the top end faces of the side walls 2B through 2E. The frame 2 can be formed through machining (pressing processes, etc.) on a metal plate. In the example that is illustrated, the frame 2 has a thin essentially rectangular solid shape (a box shape) wherein the dimension in the direction of thickness (the Z direction in the figure) is less than the dimension in the direction of width (the Y direction in the figure), and the dimension in the direction of vibration (the X direction) in the figure is greater than the dimension in the width direction.

A linear vibration motor 1 is structured from a coil 3 that is secured to the frame 2, and a magnet portion 4 that is a portion of the movable element 10. A vibration-generating current (for example, an alternating current at a resonant frequency that is determined by the mass of the movable element 10 and the coefficient of elasticity of the elastic member 6) is inputted into a coil 3 that is secured to the frame 2 from a signal inputting portion 2A1 that is provided on the frame 2, to produce Lorentz forces (driving forces) along the axial direction (the X direction in the figure) in the magnet portion 4.

In the magnet portion 4, a plurality of flat rectangular magnet pieces 4A, 4B, and 4C, which are magnetized along the axial direction (the X direction in the figure) are disposed with identical poles adjacent to each other, and spacers 4D and 4E are connected held therebetween. Here the spacers 4D and 4E may be of either magnetic materials or non-magnetic materials, and the distance between the magnet pieces 4A, 4B, and 4C, wherein the identical poles are disposed adjacent to each other, may be set to an appropriate distance. Here there are three magnet pieces 4A, 4B, and 4C that are connected together, this may instead be two pieces, or may be four pieces or more. If necessary, a reinforcing plate 5 is secured to a side face of the magnet portion 4 to increase the rigidity of the magnet portion 4 thereby.

In the coil 3, an electric wire is wound along the Y and Z directions around the magnet portion 4 wherein the direction of the magnetic pole faces the X direction, with the top face and/or bottom face thereof and, if necessary, a side face thereof as well, secured to the inner surface of the frame 2. Securing of the coil 3 to the frame 2 may be through securing directly to the frame 2, or the coil 3 may be wound onto a coil bobbin with the coil bobbin secured to the frame 2.

In the example that is illustrated, in the movable element 10, weight portions 7 are connected to both end portions of the magnet portion 4 in the axial direction (the X direction in the figure). The weight portion 7 may be structured through, for example, a metal material with a high specific density (such as tungsten), and, in the example that is illustrated, has a rectangular cross-sectional shape that has a Z-direction height that is greater than the thickness of the magnet portion 4, and a width in the Y direction that is greater than the width of the magnet portion 4. Moreover, the yoke 11 is connected to both end portions in the axial direction (the X direction in the figure) of the magnet portion 4. The yoke 11 is a member for connecting the magnet portion 4 and the weight portion 7.

A pair of guide shafts 8 is borne on the frame 2. The pair of guide shafts 8 are disposed separated along the axial direction (the X direction in the figure), where one end side of each is secured to the weight portion 7, and the other end sides form free guns that protrude in mutually opposing directions, where the free end sides are borne on bearings 9 that are equipped on supporting portions 2S of the frame 2. In the example in the figure, the supporting portions 2S are integrated with the side walls 2B and 2C, but the supporting portions 2S may instead be separate units from the side walls 2B and 2C, or may be secured to the bottom face 2A. Through integrated the supporting portions 2S with the side walls 2B and 2C, which are separate units from the bottom face 2A, and then attaching to the bottom face 2A, as in the example in the figure, the movable element 10, to which the guide shafts 8 is secured, can be assembled together easily with the frame 2. Shock absorbing members 14, for absorbing the impact when the end portions of the guide shaft 8 strike, are provided on the inner surfaces of the side walls 2B and 2C.

In the example in the figure, the pair of guide shafts 8 are secured on the movable element 10 side, but instead the pair of guide shafts 8 may be secured on the frame 2 side, and the bearings 9, for bearing the guide shafts 8, may be equipped on the movable element 10 (the weight portion 7). Preferably the guide shaft 8 is disposed coaxially with the central axis of the movable element 10, to guide the vibration of the movable element 10 along the axial direction.

In the example in the figure, the guide shaft 8 is divided and disposed, but instead a single guide shaft 8 may be passed through the magnet portion 4 and secured to the movable element 10, and borne slidably on the bearings 9 that are provided on the frame 2, or may pass through the magnet portion 4 and the movable element 10 may be supported slidably on a guide shaft that is secured on the frame 2. The guide shaft 8 may be omitted if stable vibration of the movable element 10 can be achieved.

In the example that is illustrated, the weight portions 7 comprise guide shaft supporting portions 7B for supporting guide shafts 8. The guide shaft supporting portion 7B is a part that is recessed along the axial direction from an end portion 7A of the weight portion 7, where the guide shaft 8 that has one end thereof supported on the guide shaft supporting portion 7B is supported slidably, along the axial direction (the X direction in the drawing), on a bearing 9 that is attached, through a supporting portion 2S on the bottom face 2A of the frame 2. At this time, the guide shaft supporting portion 7B of the weight portion 7 is provided with a width that is able to contain a bearing 9, where the bearing 9 is inserted into the guide shaft supporting portion 7B to secure a large amplitude for the movable element 10.

Band-shaped magnetic material pieces 12 that extend in the axial direction are secured to the inner surfaces of the side walls 2D and 2E of the frame 2, and the magnetic material portions are structured thereby. Here the frame 2 itself is formed from a non-magnetic body, where the magnetic material pieces 12 that extend in the X direction in the figure being secured to the side walls 2D and 2E form the magnetic material portions. The magnetic material pieces 12 that are illustrated in the figure are formed from iron plates, or the like, and are disposed on both sides of the guide shafts 8, essentially in parallel with the central axis G of the movable element 10 (the axis of the guide shaft 8). The magnetic material pieces 12 are not limited thereto, but rather may be made from magnetic material layers or magnetic material films that are adhered over parts of the side walls 2D and 2E, which are non-magnetic bodies. Moreover, instead of forming the magnetic material portions through securing magnetic material pieces 12 to the side walls 2D and 2E that are non-magnetic bodies, magnetic material portions may be used wherein parts, which protrude in the Y direction and which extend in the X direction, are formed on side walls 2D and 2E, which are magnetic materials.

As illustrated in FIG. 4, in the movable element 10, the cross-sectional shape, crossing in the axial direction (the X direction in the figure), is provided with a long edge. Specifically, the movable element 10 has a rectangular cross-section that has a long edge and a short edge. Additionally, the frame 2 comprises a pair of inner surfaces that face each other along the long edge (that is, the inner surface of the cover plate 2Q in the bottom face 2A), and a pair of inner surfaces that face each other along the short edge (the inner surfaces of the side walls 2D and 2E), with magnetic material pieces 12, which are band-shaped and that extend along the X direction, secured to the pair of inner surfaces that face each other along the short edge.

In contrast, the yoke 11 that is the connecting member for connecting the magnet portion 4 and the weight portion 7 has a long edge and a short edge that are longer than the long edge and the short edge of the magnet portion 4, where a raised portion 11A is formed adjacent to the magnetic material portion at the center part of the short edge of the yoke 11. In the example in the figure, the raised portion 11A and the magnetic material portion (the magnetic material piece 12) are provided on both sides with the central axis G of the movable element 10 (the axis of the guide shaft 8, if a guide shaft 8 is provided) lying therebetween, but if the orientation of the movable element 10 can be held stably, the raised portion 11A and the magnetic material portion (the magnetic material piece 12) need only be provided on one side.

The elastic members 6 are disposed non-coaxially with the pair of guide shafts 8 along the axial direction, and apply, to the movable element 10, elastic forces that oppose the driving forces produced by the coil 3 and the magnet portion 4. In the example that is illustrated, coil springs that extend and compress along the axial direction (the X direction) are used as the elastic members 6, where two elastic members 6, one on each side, are disposed between the weight portion 7 and the side walls 2B and 2C of the frame 2. In the example that is illustrated, the axis of the elastic members 6 is disposed so as to be parallel to the pair of guide shafts 8. Additionally, one end of the elastic member 6 engages with a supporting protrusion 2P that is provided on the side wall 2B or 2C of the frame 2, and the other end of the elastic member 6 engages with a supporting protrusion that is provided on the end portion 7A of the weight portion 7.

The operation of such a linear vibration motor 1 will be explained. When not driven, the movable element 10 stands still in the vibration center position wherein the elastic forces of the elastic members 6 are in equilibrium. Moreover, when the vibration generating current of a resonant frequency that is determined by the mass of the movable element 10 and the coefficient of elasticity of the elastic members 6 is inputted into the coil 3, a driving force in the X direction is applied to the magnet portion 4, and the movable element 10 is caused, by the driving force and the elastic repelling force of the elastic members 6, to undergo reciprocating vibration along the axial direction (the X direction in the figure).

At this time, the raised portions 11A of the yoke 11 that is provided on the movable element 10 being adjacent to the magnetic material portions that are made from the magnetic material pieces 12 that are provided on the side walls 2D and 2E of the frame 2 causes the magnetic flux to be concentrated between the raised portions 11A and the magnetic material portions, so that the raised portions 11A and the magnetic material portions attract each other, stabilizing the orientation of the movable element 10. Here the provision of raised portions 11A of the yoke 11 on both sides of the central axis G of the movable element 10, and provision at the center part of the short edge of the movable element 10, makes it possible to maintain the orientation of the movable element 10 so as to be parallel to the bottom face 2A of the frame 2.

Through this, the movable element 10 is held so as to be parallel to the bottom face 2A of the frame 2 when undergoing reciprocating vibration along the guide shaft 8, so as to enable vibration without extraneous contact with the frame 2. This makes it possible to achieve a linear vibration motor 1 with reduced actuation noise at the time of vibration.

In this linear vibration motor 1, the pair of guide shafts 8 is split and does not pass through the magnet portion 4, making it possible to secure a magnet volume that is able to produce an adequate driving force through a magnet portion 4 that is thin in the Z direction and wide in the Y direction, regardless of the diameter of the pair of guide shafts 8. This enables the production of a thin linear vibration motor 1 able to produce a sufficient driving force.

Moreover, the linear vibration motor 1, wherein the movable element 10 is supported by the pair of guide shafts 8 that are disposed coaxially is able to reduce the width on the left and the right, because there is no need for shaft placement space on the left and right of the magnet portion 4, when compared to the prior art wherein a pair of stationary shafts that extend along the direction of vibration is provided on both the left and the right sides of the magnet.

Furthermore, disposing the elastic members 6 off-axis in relation to the pair of guide shafts 8 enables a reduction in the diameter of the elastic members 6 regardless of the diameter of the pair of guide shafts 8. When the diameters of the elastic members 6 are reduced, the elastic force can be set as appropriate through the selection of the material for the elastic members 6, and through providing a plurality of elastic members 6 in parallel. This can also reduce the thickness of a linear vibration motor 1 wherein a movable element 10 is supported on a shaft.

As explained above, the linear vibration motor 1 according to an embodiment according to the present invention, through reducing the thickness dimension of the movable element 10 to less than that of the width dimension, enables the thickness of the linear vibration motor to be reduced, and despite the movable element 10 being in a flat form in this way, enables prevention of actuation noise that would be caused uncontrolled rotation of the movable element 10. This enables stabilized vibration without rattling, and enables improved manufacturability when compared to the conventional technology wherein two parallel stationary shafts are provided.

Moreover, the movable element 10 being supported axially by the pair of split guide shafts 8 can produce a vibration that is as stabilized as a case wherein stationary shafts are provided, and can also achieve resistance to damage when there is a dropping impact, or the like. Additionally, such a linear vibration motor 1 can be made thinner and more compact in the width direction, and can suppress suppressing a reduction in the volume of the magnet portion 4 and the weight portion 7.

Figure 5:
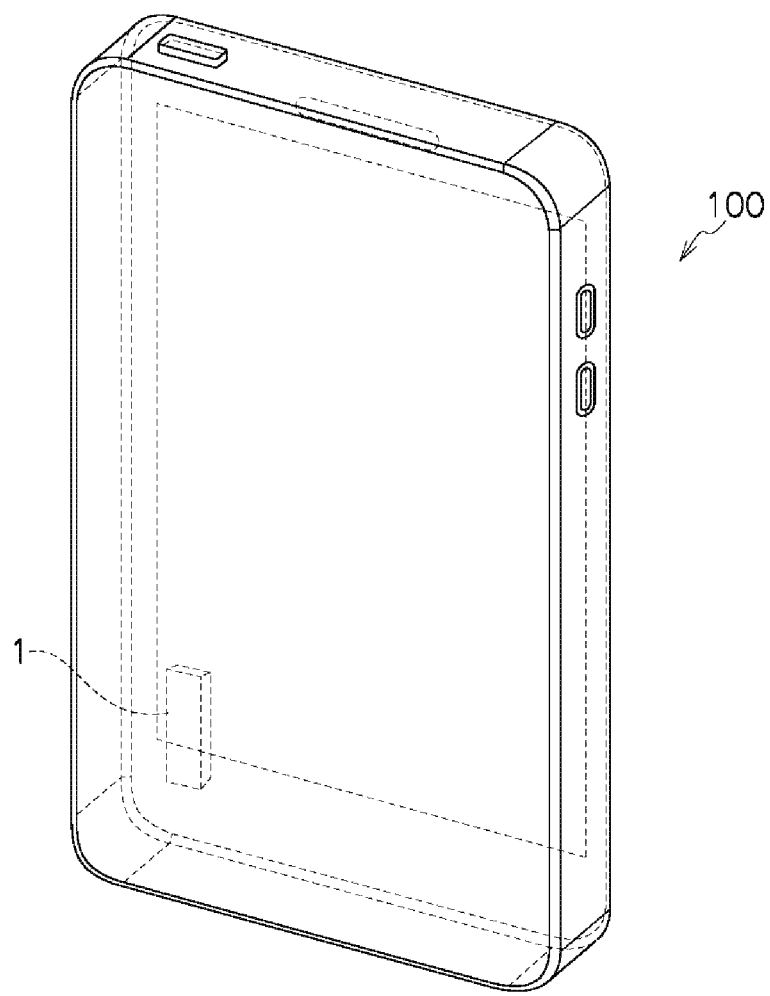
FIG. 5 is an explanatory diagram illustrating the electronic device (a mobile information terminal) equipped with a linear vibration motor according to an embodiment according to the present invention.

FIG. 5 shows a mobile information terminal 100 as an example of an electronic device equipped with a linear vibration motor 1 according to an embodiment according to the present invention. The mobile information terminal 100 that is equipped with the linear vibration motor 1 that can produce a stabilized vibration and for which the thickness can be reduced and which can be made more compact in the width direction enables the user to be notified through a stabilized vibration that does not tend to produce noise, when there is an incoming call in a communication function or at the beginning or end of an operation such as an alarm function. Moreover, this makes it possible to produce a mobile information terminal 100 with high mobility and which facilitates design performance, through the linear vibration motor 1 having reduced thickness and being more compact in the width direction. Furthermore, because the linear vibration motor 1 is of a compact shape wherein the various components are contained within a frame 2 of a rectangular shape wherein the thickness is suppressed, it can be mounted, with excellent space efficiency, within a thinner mobile information terminal 100.

While embodiments according to the present invention were described in detail above, referencing the drawings, the specific structures thereof are not limited to these embodiments, but rather design variations within a range that does not deviate from the spirit and intent of the present invention are also included in the present invention. Moreover, insofar as there are no particular contradictions or problems in purposes or structures, or the like, the technologies of the various embodiments described above may be used together in combination.

The invention claimed is:

1. A linear vibration motor comprising:
   a movable element equipped with a magnet portion, a weight portion, and a yoke;
   a frame containing the movable element;
   a coil, secured to the frame, applying a driving force to the magnet portion so as to cause the movable element to vibrate reciprocatingly along an axial direction; and
   an elastic member applying, to the movable element, an elastic force that opposes the driving force that is applied to the magnet portion, wherein:
   the movable element comprises a magnetic material portion extending along the direction of vibration of the movable element and is provided on an inner surface of the frame,
   the yoke comprises a raised portion near the magnetic material portion, and
   the raised portion and the magnetic material portion are attracted to each other, such that an orientation of the movable element is stabilized through magnetic flux.

2. The linear vibration motor as set forth in claim 1, wherein:
   a guide shaft, disposed coaxially with the central axis of the movable element, guiding the vibration of the movable element, is supported on the frame; and
   the magnetic material portion is disposed on both sides with the guide shaft held therebetween.

3. The linear vibration motor as set forth in claim 1, wherein:
   the magnetic material portion is structured through a band-shaped magnetic material piece that is secured to an inner surface of the frame.

4. The linear vibration motor as set forth in claim 1, wherein:
   in the movable element, the cross-sectional shape that is perpendicular to the axial direction has a long edge and a short edge;
   the magnetic material portion is provided on an inner surface of the frame, facing the short edge; and
   the raised portion of the yoke is provided on a center part of the short edge.

5. A linear vibration motor as set forth in claim 1, wherein:
   in the magnetic material portion, a plurality of magnets pieces, having directions of magnetization that face in the axial direction, is arranged so that identical poles are adjacent; and the two axial-direction end portions of the magnet portion are connected to the yoke and the weight portion.

6. A mobile electronic device comprising a linear vibration motor as set claim 1.

* * * * *